United States Patent [19]

Stillwell

[11] Patent Number: 4,608,528
[45] Date of Patent: Aug. 26, 1986

[54] BATTERY CHARGER ADAPTER

[75] Inventor: Billy E. Stillwell, Gainesville, Fla.

[73] Assignee: General Electric Company, Gainesville, Fla.

[21] Appl. No.: 877,281

[22] Filed: Feb. 13, 1978

[51] Int. Cl.⁴ .......................... H02J 7/00; H01M 2/10; H01M 10/46

[52] U.S. Cl. .......................................... 320/2; 320/25; 429/1; 429/100; 339/184 R

[58] Field of Search ........................ 320/2, 3, 4, 25, 35; 429/1, 7-9, 96, 97, 100, 121, 163; 339/184 M, 278 M, 29 B, 228, 256 R, 256 RT, 258 R, 258 A

[56] References Cited

U.S. PATENT DOCUMENTS

| | | | |
|---|---|---|---|
| 1,075,556 | 10/1913 | Fenoughty | 429/99 |
| 1,487,430 | 3/1924 | Balderston | 429/99 |
| 1,627,264 | 5/1927 | Baird | 429/99 |
| 2,431,116 | 11/1947 | Grover | 429/99 |
| 2,649,493 | 8/1953 | Temple | 429/160 |
| 2,876,410 | 3/1959 | Fry | 320/48 |
| 2,982,849 | 5/1961 | Volkerling et al. | 362/183 |
| 3,056,850 | 10/1962 | Rauske et al. | 429/157 |
| 3,256,474 | 6/1966 | Englund, Jr. | 320/2 |
| 3,329,881 | 7/1967 | Tolmie | 320/2 |
| 3,347,709 | 10/1967 | Taylor et al. | 429/153 |
| 3,435,318 | 3/1969 | Mas | 320/15 |
| 3,440,105 | 4/1969 | Yamamoto et al. | 429/153 |
| 3,518,524 | 6/1970 | Roszyk | 320/2 |
| 3,665,285 | 5/1972 | Mullersman et al. | 320/2 |
| 3,684,583 | 8/1972 | Lehnen et al. | 429/100 X |
| 3,696,283 | 10/1972 | Ackley, III | 320/2 |
| 3,735,232 | 5/1973 | Fister | 320/2 |
| 3,752,705 | 8/1973 | Pensabene | 429/94 |
| 3,969,148 | 7/1976 | Trattner | 429/100 |
| 3,977,907 | 8/1976 | Roth et al. | 429/7 |
| 3,980,388 | 9/1976 | Nailor, III | 339/256 RT |
| 3,986,894 | 10/1976 | Ciliberti, Jr. | 429/153 |
| 3,990,919 | 11/1976 | Krueger | 429/100 |
| 4,006,396 | 2/1977 | Bogut | 320/35 X |
| 4,084,037 | 4/1978 | Morton | 429/1 |
| 4,084,123 | 4/1978 | Lineback et al. | 320/2 |

FOREIGN PATENT DOCUMENTS 887290 11/1971 Canada .

*Primary Examiner*—R. J. Hickey
*Attorney, Agent, or Firm*—Henry J. Policinski

[57] ABSTRACT

A charging system for rechargeable batteries, e.g. of the 9 volt type, includes a charger and an adapter module for mechanically and electrically interconnecting the charger to a 9 volt size battery. The adapter includes a projection or key extending upwardly from and adjacent the battery terminals to block connection of all batteries except those batteries with key receivers. In this manner, only rechargeable batteries with such receivers may be charged thereon. Finger grips on the adapter are designed to generate a moment for detachment from the charger.

21 Claims, 8 Drawing Figures

BATTERY CHARGER ADAPTER

CROSS REFERENCE TO RELATED APPLICATIONS

This application is related to the following commonly assigned applications filed contemporaneously herewith: Ser. No. 878,453 filed Feb. 16, 1978, now U.S. Pat. No. 4,211,968; Ser. No. 877,297, filed Feb. 13, 1978, now U.S. Pat. No. 4,229,686; Ser. No. 877,299, filed Feb. 13, 1978, now U.S. Pat. No. 4,213,079.

BACKGROUND OF THE INVENTION

This invention relates to rechargeable batteries and more particularly to a simple, inexpensive, charging system whereby a rechargeable battery of the 9 volt physical size and/or electrical characteristics are selectively and alternatively connectible to a charge current source for recharging of the type described in U.S. Pat. No. 4,009,429.

There is an increasing number of consumer products being operated by rechargeable cells such as nickel-cadmium cells. These products require cells with a plurality of physical sizes and electrical characteristics. The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction. The system described in the above-identified U.S. Pat. No. 4,009,429 is useful in charging AA, C & D size batteries, but does not accept 9 volt size batteries. The system described in U.S. Pat. No. 4,229,686, readily accepts 9 volt size battery with the use of an adapter.

The ability to charge standard size batteries, e.g. 9 volt snap fit terminal types, raises problems since non-rechargeable batteries may also be attached improperly to the charger with the possibility of damage to the battery or consumer during charging.

SUMMARY

The present invention is an improvement on the system described in Ser. No. 877,297, now U.S. Pat. No. 4,229,686 whereby only rechargeable batteries may be charged.

The system of this invention utilizes a safety interface in combination with the charger and 9 volt size battery which prevents misapplication of batteries. More specifically, the charging means or adapter is designed to mechanically block all batteries from attachment to the charger except those batteries equipped with a cooperating "pass".

DETAILED DESCRIPTION

Figure 1:
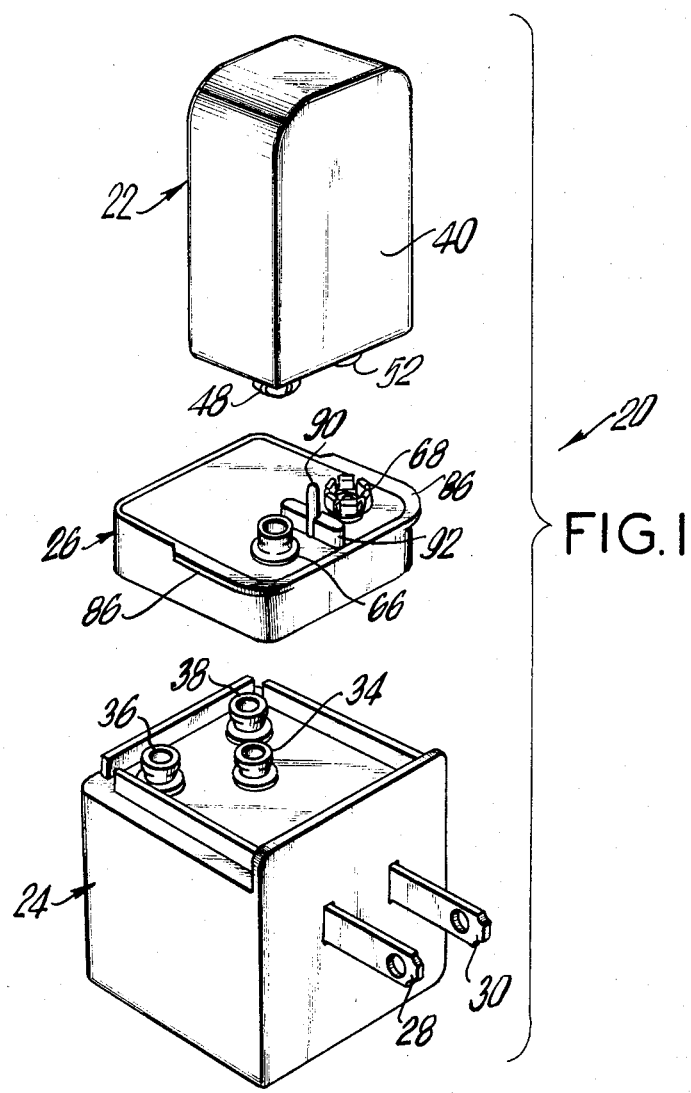
FIG. 1 is an exploded, perspective view of a charge current source, an adapter and a 9 volt battery of the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

The overall system 20 is shown in FIG. 1. System 20 includes a rechargeable battery 22, a source 24 and an adapter 26. FIG. 1 is an exploded perspective view of the components of the system when assembled for charging.

The Charge Source

Figure 8:
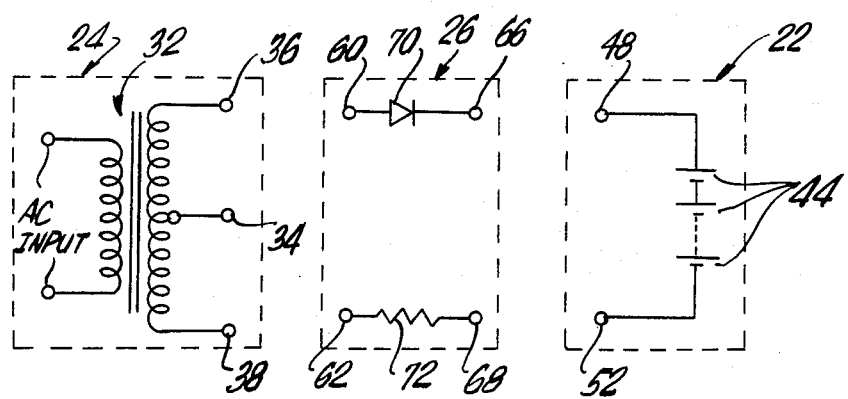
FIG. 8 is a circuit diagram of the charger, adapter and battery.

The charge current source 24 is comprised of a conventional high impedance center tapped transformer, which is illustrated schematically in FIG. 8 by block 24. Two blades 28, 30 are provided in one face of the charger housing for connection to a source of 120 VAC. Source 24 is available commercially from the assignee, General Electric Company, under the designation BC3 miniature charger, and is described in the above-identified U.S. Pat. No. 4,009,429.

As shown in FIG. 8, the source 24 comprises a transformer 32 to make available from the standard 110–120 volt cycle AC line an output current of appropriate magnitude for the load provided. Terminal 34 is centrally tapped to the secondary of transformer 32, while terminals 36 and 38 are end tapped to the secondary of the transformer.

As shown in FIG. 1, terminals 34, 36 and 38 are one-way, snap-type "male" terminals attached to a face of source 24.

The Rechargeable Battery

Figure 3:
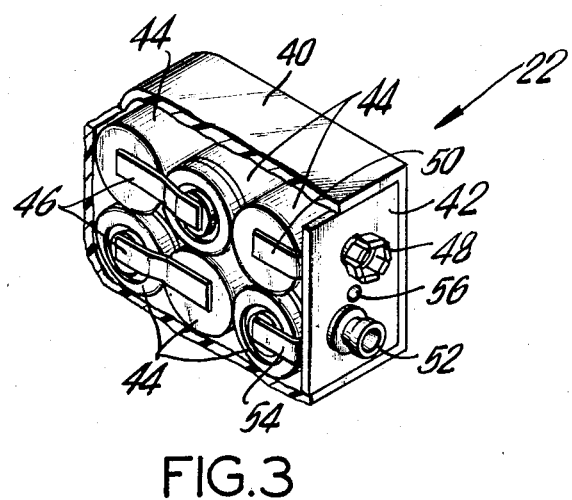
FIG. 3 is a perspective view of a 9 volt size battery with portions broken away for clarity of illustration.

Rechargeable battery 22, FIG. 3, includes a generally rectangular shaped housing 40 which is open at one end and closure end plate 42 which may be formed of an insulating plastic material such as polystyrene. End plate 42 is joined to housing 40 by means of adhesive or ultrasonic welding techniques.

Battery 22 is sized for 9 volt usage in its physical dimensions and includes 6 rechargeable nickel cadmium cells 44 having a nominal voltage of 1.25 V.D.C. The cells 44 are connected in series by conductive straps 46 (only two are illustrated).

The first cell 44 is connected to a female one-way snap terminal 48 carried on end plate 42 by conductive strip 50. The last cell 44 of the series is connected to a male one-way snap terminal 52 by conductive strap 54 to complete the electrical circuit of the battery, as shown in FIG. 8.

Figure 4:
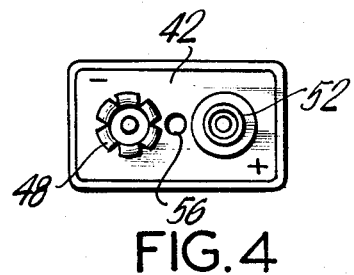
FIG. 4 is an end view of the battery of FIG. 3.

Since battery 22 is rechargeable and of the physical size of ordinary non-rechargeable 9 volt batteries, it is preferred to have security means on the battery which cooperate with adapter 26 to permit only rechargeable battery to be used therewith. To this end an aperture 56 is provided in end plate 42 between the terminals 48 and 52, see FIG. 4. As described below, this aperture 56 allows battery 22 to be attached to adapter 26, but not ordinary batteries.

The Adapter

Adapter 26 is the bridging element between charger 24 and battery 22 and serves two functions; namely, physically attaching or mounting the battery and electrically connecting the terminals 36 and 38 of the charger to terminals 48 and 52 of the battery.

Figure 5:
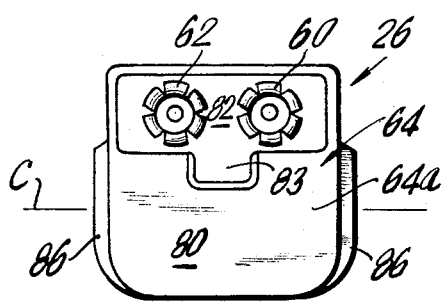
FIG. 5 is a bottom plan view of the adapter.
Figure 6:
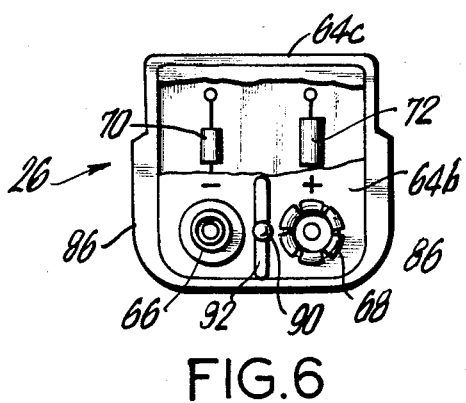
FIG. 6 is a top plan view of the adapter with certain portions broken away for clarity of illustration.

To these ends, adapter 26 includes a pair of one-way female snap terminals 60, 62 attached to one surface of housing 64, see FIG. 5, which interconnect with charger terminals 36 and 38, and on an opposite surface a second set of one-way snap terminals, a male terminal 66 and female terminal 68, FIG. 6, which interconnect with battery terminals 48 and 52, respectively. The one-way snap type terminal not only provides electrical contact but also mechanical gripping to support the battery on the charger.

Electrical circuitry is carried by the adapter to provide suitable conditioning of the source to battery characteristic by current and voltage control. To this end rectifying means, particularly a half-way rectifier 70, such as a diode, is connected between terminals 60 and 66 and a resistor 72 is connected between terminal 62 and 68 to produce the circuit shown in FIG. 8. It will be appreciated by those skilled in the art that other arrangements of electrical components may also be utilized to provide suitable conditioning of the source to the battery.

Figure 7:
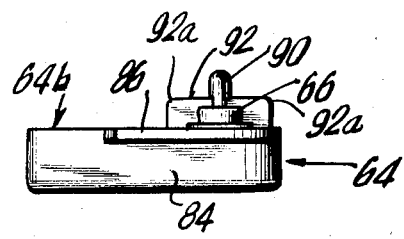
FIG. 7 is a side elevation view of the adapter.

Adapter housing 64 is preferably of a molded plastic construction and may be fabricated in a number of methods and configurations as described herein. The adapter housing shown in FIGS. 5-7 has a fully enclosed structure formed by a housing portion 64a and closure portion 64b. Portion 64a and 64b may be separately molded pieces or integrally joined by a hinge 64c.

Housing portion 64a includes a contoured bottom surface. Bottom surface as used herein refers to the surface which abuts against the charger, and top surface refers to the surface of the adapter which abuts against the battery when the system components are assembled for charging, FIG. 1. The contoured bottom, FIG. 5, contains a flat portion 80 and a recessed portion 82 wherein terminals 60 and 62 are located. Recessed portion 82 also includes a clearance area 83 to receive terminal 34 therein when the adapter 26 is positioned on charger 24. Side walls 84 extend upwardly from bottom surface 80 to define an internal cavity for receipt of diode 70 and resistor 72.

Closure portion 64b has a generally flat surface and carries terminals 66 and 68 thereon. Portion 64b is joined to portion 64a by the use of adhesive or ultrasonic bonding techniques.

Finger Grips

A pair of laterally extending finger grips 86 are provided at the top edge of portion 64a. Grips 86 are positioned such that their centers, shown by line C, are offset from the center line of terminals 60 and 62. In this manner, when the grips 86 are manually grasped and pulled, a moment or torque about terminals 60 and 62 is produced to facilitate removal of the adapter from the charger terminals 36 and 38.

Adapter Safety Interface

As discussed above, only rechargeable batteries can be utilized in the system. To cooperate with the aperture 56 in end plate 42 of the battery, an index means or key in the form of an upwardly extending projection 90 is provided on adapter 26 between terminals 66 and 68.

Figure 2:
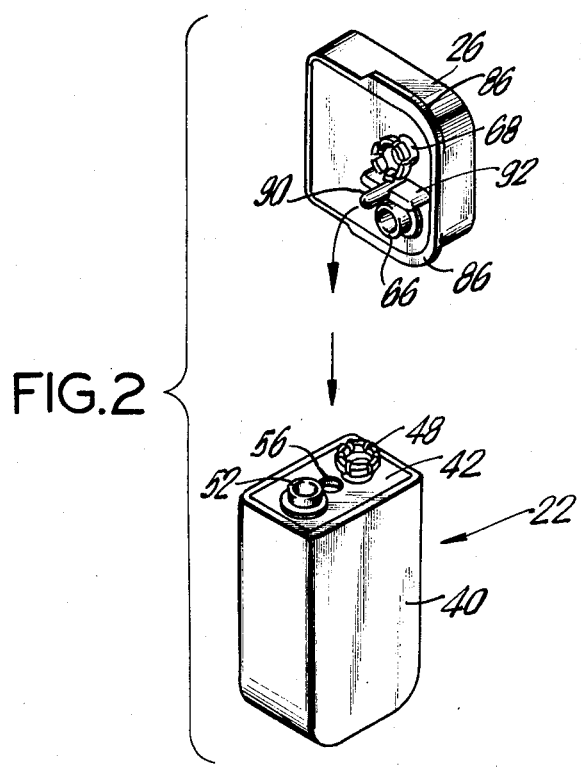
FIG. 2 is an exploded, perspective view of a 9 volt size battery and adapter with the adapter rotated 90°.

As best illustrated in FIG. 2, when the terminals of battery 22 are snap-fitted to the terminals of adapter 26, key 90 passes through aperture 56. It will be appreciated that the combination of aperture 56 and key 90 function to allow only rechargeable batteries of the type shown in FIG. 4 to be connected since projection 90 will contact the end plate of non-conforming batteries and prevent their connection to the adapter.

Since terminals 66, 68 and 48, 52 are snap type, it is advantageous to provide battery removal assist means to the adapter 26. To this end, upstanding fulcrum or wall 92 is provided between terminals 66 and 68. Wall 92 is equidistant and perpendicular to the terminal centerlines and of a height such that the battery terminal may be attached to the charger terminals and the top surface of wall 92 abuts against end plate 42. In this manner, when the battery is to be removed from the adapter, it is pivoted in the plane of wall 92 so that one of the top end edges 92a act as a fulcrum to assist in separating the battery from the adapter.

These and other modifications may be made to the invention without departing from the scope and spirit thereof as pointed out in the appended claims.

What is claimed is:

1. In a battery charging system which includes a rechargeable battery having terminals and charging means having corresponding terminals adapted to contact said battery terminals, the improvement of a safety interface comprising:
   index means on said charging means operative to prevent battery terminal contact with said charging means terminals when a battery is not equipped to mate with said index means; and
   a battery housing, said index means including a fulcrum disposed among terminals of said charging means about which fulcrum said charging means can pivot relative to said housing, said housing having index receiving means to mate with said index means when said charger and battery terminals are connected whereby only a battery having said index receiving means may be connected to said charging means.

2. The system of claim 1, wherein said battery is a multiple cell battery.

3. The system of claim 1, wherein said index means includes a projection extending from said charging means.

4. The system of claim 3, wherein said index receiving means includes a surface of said battery housing having a cavity to receive said projection therein.

5. In a battery charging system which includes a rechargeable battery having terminals and charging means having corresponding terminals adapted to contact said battery terminals, the improvement of a safety interface comprising:
   index means on said charging means operative to prevent battery terminal contact with said charger means terminals when a battery is not equipped to mate with said index means, said index means including a projection extending from said charging means;
   a battery housing having index receiving means to mate with said index means upon connection of the terminals of said charging means and said battery whereby only a battery having said index receiving means may be connected to said charging means; and wherein said charging means has a pair of snap-type terminals, said index means being disposed alongside said snap-type terminals for mating with said battery.

6. In a battery charging system which includes a rechargeable battery having terminals and charging means having corresponding terminals adapted to contact said battery terminals, the improvement of a safety interface comprising:

index means on said charging means operative to prevent battery terminal contact with said charger means terminals when a battery is not equipped to mate with said index means, said index means including a projection extending from said charging means;

a battery housing having index receiving means to mate with said index means when said charger and battery terminal are connected whereby only a battery having said index receiving means may be connected to said charging means; and wherein said charging means has a pair of snap-type terminals and wherein said projection is located between said pair of snap-type terminals.

7. In a battery charging system which includes a rechargeable battery having terminals and charging means having corresponding terminals adapted to contact said battery terminals, the improvement of a safety interface comprising:

index means on said charging means operative to prevent battery terminal contact with said charger means terminals when a battery is not equipped to mate with said index means;

a battery housing having index receiving means to mate with said index means when said charger and battery terminals are connected whereby only a battery having said index receiving means may be connected to said charging means; and wherein said charger means further comprises fulcrum means adjacent to said terminals, said fulcrum means being an upstanding wall located so as to contact said battery housing between said battery terminals to form at least one pivot point about which said battery may be pivoted relative to said charger means to facilitate disconnection between the battery and charger means terminals.

8. In a battery charging system which includes a rechargeable battery having terminals and charging means having corresponding terminals adapted to contact said battery terminals, the improvement of a safety interface comprising:

index means on said charging means operative to prevent battery terminal contact with said charger means terminals when a battery is not equipped to mate with said index means;

a battery housing having index receiving means to mate with said index means when said charger and battery terminals are connected whereby only a battery having said index receiving means may be connected to said charging means;

said charger means further comprising fulcrum means adjacent to said terminals, said fulcrum means being located so as to contact said battery housing to form at least one pivot point about which said battery may be pivoted relative to said charger means to facilitate disconnection between the battery and charger means terminals; and wherein said battery and charger means terminals are snap-type terminals.

9. The system of claim 8, wherein said fulcrum means defines a pair of pivot points disposed on opposite sides of a line connecting the axes of said snap-type terminal to provide left-hand and right-hand pivoting action.

10. The system of claim 8, wherein said charger means includes a pair of terminals and said fulcrum means is located equidistant from said terminal pair.

11. The system of claim 8, wherein said fulcrum means comprises a member extending from said charger means for engaging the battery housing when said battery and charger means terminals are engaged and the battery is pivoted about its terminals.

12. In a battery charging system which includes a rechargeable battery having terminals and charging means having corresponding terminals adapted to contact said battery terminals, the improvement of a safety interface comprising:

index means on said charging means operative to prevent battery terminal contact with said charging means terminals when a battery is not equipped to mate with said index means;

a battery housing, said index means extending from a surface of said charging means to contact said housing and to serve as a fulcrum about which said charging means can pivot realtive to said housing, said housing having index receiving means to mate with said index means when said charger and battery terminals are connected whereby only a battery having said index receiving means may be connected to said charging means; and wherein said charger means includes a charge source and an adapter, said index means being on said adapter.

13. A rechargeable battery comprising a casing, a power cell disposed within said casing; a cover plate for said casing; a pair of snap-type terminals affixed to said cover plate and connected to positive and negative terminal connections of said power cell, said casing defining an aperture adjacent said terminals for receiving an alignment key, whereby said battery may be snap fitted to charging means having a projection receivable in said aperture.

14. A rechargeable battery of claim 13, wherein said battery is a nickel cadmium battery.

15. A rechargeable battery of claim 14, wherein said aperture is located between said terminals.

16. A charger adapter comprising an adapter body, a set of one-way snap-fit terminals mounted on a first surface of said body, said body including index means spaced apart from said terminals, manually graspable means formed integrally with and extending from said body and located with respect to said terminals such that said graspable means are offset from the center line passing through the centers of said terminals, whereby a torque is produced about said center line when said graspable means are pulled with respect to said terminals.

17. The charger adapter of claim 16, wherein said manually graspable means are located at a surface opposite said first surface.

18. The charger adapter of claim 17, wherein said manually graspable means are a pair of laterally extending flanges.

19. A charger adapter comprising an adapter body, a set of one-way snap-fit terminals mounted on a first surface of said body, manually graspable means formed integrally with and extending from said body and located with respect to said terminals such that said graspable means are offset from the center line passing through the centers of said terminals, whereby a torque is produced about said center line when said graspable means are pulled with respect to said terminals; said adapter further comprising a set of terminals on a second surface of said adapter, and an upstanding wall between two of said terminals on said second surface about which said adapter may be pivoted on an axis of pivot perpendicular to an axis of said torque.

20. In a battery charging system which includes a rechargeable battery having terminals, and charging means having corresponding terminals adapted to contact said battery terminals, the improvement of a safety interface comprising:

index means on said charging means operative to prevent battery terminal contact with said charging means terminals when a battery is not equipped to mate with said index means; and a battery housing having index receiving means to mate with said index means when said charger and said battery terminals are connected whereby only a battery having said index receiving means may be connected to said charging means, a portion of said index means extending from said charging means to contact a surface of said battery housing upon a connection of said battery terminals and said charging means terminals to serve as a fulcrum about which said battery housing can be pivoted relative to said charging means.

21. In a battery charging system which includes a rechargeable battery having terminals, and charging means having corresponding terminals adapted to contact said battery terminals, the improvement of a safety interface comprising:

index means on said charging means operative to prevent battery terminal contact with said charging means terminals when a battery is not equipped to mate with said index means; and a battery housing having index receiving means to mate with said index means when said charger and battery terminals are connected whereby only a battery having said index receiving means may be connected to said charging means, said index receiving means including an aperture on an external surface of said battery housing to receive a projection of said index means while said surface adjacent said aperture is position relative to said index means for contacting a portion of said index means to pivot thereon.

* * * * *